(12) United States Patent
Shoshan et al.

(10) Patent No.: US 9,960,832 B2
(45) Date of Patent: May 1, 2018

(54) ADD-ON APPARATUS FOR SYNCHRONIZATION OF FREQUENCY DIVERSITY COMMUNICATIONS AND METHODS USEFUL IN CONJUNCTION THEREWITH

(71) Applicant: Elta Systems Ltd., Ashdod (IL)

(72) Inventors: Yaakov Shoshan, Ashkelon (IL); Gil Koifman, Petach-Tikva (IL); Michael Elmakias, Ashdod (IL)

(73) Assignee: Elta Systems Ltd., Ashdod (IL)

( * ) Notice: Subject to any disclaimer, the term of this patent is extended or adjusted under 35 U.S.C. 154(b) by 143 days.

(21) Appl. No.: 14/892,331

(22) PCT Filed: May 20, 2014

(86) PCT No.: PCT/IL2014/050437
§ 371 (c)(1),
(2) Date: Nov. 19, 2015

(87) PCT Pub. No.: WO2014/188413
PCT Pub. Date: Nov. 27, 2014

(65) Prior Publication Data
US 2016/0112114 A1    Apr. 21, 2016

(30) Foreign Application Priority Data

May 23, 2013   (IL) .......................................... 226509
Mar. 10, 2014  (IN) .............................. 681/DEL/2014

(51) Int. Cl.
*H04B 7/208*    (2006.01)
*H04B 7/12*     (2006.01)
(Continued)

(52) U.S. Cl.
CPC ............... *H04B 7/12* (2013.01); *H04B 1/713* (2013.01); *H04L 27/2626* (2013.01);
(Continued)

(58) Field of Classification Search
None
See application file for complete search history.

(56) References Cited

U.S. PATENT DOCUMENTS 2,292,386 A    8/1942   Manson
4,475,243 A    10/1984  Batlivala et al.
(Continued)

FOREIGN PATENT DOCUMENTS

WO    2007/123733 A2    11/2007
WO    2010/132476 A2    11/2010
(Continued)

OTHER PUBLICATIONS

Torvmark, K.H., "Frequency Hopping Systems," Chipcon Products from Texas Instruments, Application Note AN014, <http://www.ti.com/lit/an/swra077/swra077.pdf>, pp. 1-7 (Dec. 31, 2002).

*Primary Examiner* — Bob Phunkulh
(74) *Attorney, Agent, or Firm* — Mintz Levin Cohn Ferris Glovsky and Popeo, P.C.; Steven M. Jensen

(57) ABSTRACT

Add-on apparatus dynamically enhancing frequency diversity of a main signal sent over an existing communication system, the system using a communication protocol to convey the main signal from a Tx end to an Rx end, the add-on apparatus comprising a Transmission Frequency Converter (TFC) at the Tx end operative while the system is transmitting the main signal, to at least once shift a given center frequency about which the system is transmitting, to at least one corresponding alternative center frequency, wherein the TFC and an Reception Frequency Converter at the Rx end share prior knowledge defining how each shift of the given center frequency is to be timed relative to at least one recognizable element within the known communication protocol and wherein the Transmission Frequency Converter is operative to use the prior knowledge to recognize the at
(Continued)

least one recognizable element and to shift the center frequency accordingly.

21 Claims, 12 Drawing Sheets

(51) Int. Cl.
 *H04B 1/713* (2011.01)
 *H04L 27/26* (2006.01)
 *H04W 56/00* (2009.01)
 *H04W 84/04* (2009.01)
 *H04W 84/12* (2009.01)

(52) U.S. Cl.
 CPC ....... *H04L 27/2647* (2013.01); *H04W 56/001* (2013.01); *H04W 84/042* (2013.01); *H04W 84/12* (2013.01)

(56) References Cited

U.S. PATENT DOCUMENTS

| | | | |
|---|---|---|---|
| 4,752,939 A | 6/1988 | Amoroso et al. | |
| 4,849,963 A | 7/1989 | Kawano et al. | |
| 4,941,200 A | 7/1990 | Leslie et al. | |
| 5,774,450 A * | 6/1998 | Harada | H04L 27/261 370/206 |
| 6,023,491 A | 2/2000 | Saka et al. | |
| 6,980,509 B1 * | 12/2005 | Okada | H04L 5/06 370/208 |
| 7,003,291 B2 | 2/2006 | Zhnag | |
| 7,231,197 B1 * | 6/2007 | Fisher | G01S 11/10 342/357.57 |
| 7,711,029 B2 | 5/2010 | Guey | |
| 2002/0003773 A1 * | 1/2002 | Okada | H04L 5/06 370/208 |
| 2002/0034214 A1 * | 3/2002 | Okada | H04L 5/023 375/147 |
| 2003/0214919 A1 | 11/2003 | Kilfoyle et al. | |
| 2004/0095902 A1 | 5/2004 | Laroia et al. | |
| 2004/0264548 A1 * | 12/2004 | Miyoshi | H04L 5/0053 375/141 |
| 2005/0109917 A1 | 5/2005 | Wong | |
| 2005/0181799 A1 | 8/2005 | Laroia et al. | |
| 2006/0002288 A1 * | 1/2006 | Okada | H04L 27/2602 370/208 |
| 2006/0198292 A1 | 9/2006 | Yoshii et al. | |
| 2006/0222054 A1 | 10/2006 | Conyers et al. | |
| 2006/0223468 A1 | 10/2006 | Toms et al. | |
| 2007/0177691 A1 * | 8/2007 | Ruprich | H03J 7/02 375/321 |
| 2007/0254592 A1 * | 11/2007 | McCallister | H03F 1/0205 455/67.11 |
| 2007/0259636 A1 * | 11/2007 | Fisher | G01S 3/043 455/207 |
| 2008/0287081 A1 * | 11/2008 | Van Dam | H04B 1/0096 455/142 |
| 2009/0109919 A1 * | 4/2009 | Bertrand | H04L 27/2633 370/330 |
| 2009/0232071 A1 * | 9/2009 | Cho | H04L 5/0044 370/329 |
| 2010/0048155 A1 * | 2/2010 | Wang | H04B 1/1027 455/234.1 |
| 2010/0074349 A1 * | 3/2010 | Hyllander | H04L 27/2647 375/260 |
| 2010/0120397 A1 | 5/2010 | Kazmi et al. | |
| 2011/0081856 A1 | 4/2011 | Johansson et al. | |
| 2011/0150043 A1 | 6/2011 | Bergervoet et al. | |
| 2011/0207495 A1 | 8/2011 | Gerstenberger et al. | |
| 2011/0286397 A1 | 11/2011 | Kim et al. | |
| 2012/0163333 A1 | 6/2012 | Arnott et al. | |
| 2012/0309299 A1 | 12/2012 | Kimura et al. | |
| 2013/0064314 A1 | 3/2013 | Ko et al. | |
| 2013/0094490 A1 * | 4/2013 | Taromaru | H04L 25/03834 370/343 |
| 2013/0287152 A1 * | 10/2013 | Wu | H04B 1/0053 375/344 |
| 2013/0315320 A1 * | 11/2013 | McGowan | H04L 27/2655 375/260 |
| 2016/0099747 A1 | 4/2016 | Koifman et al. | |
| 2016/0119050 A1 | 4/2016 | Koifman et al. | |

FOREIGN PATENT DOCUMENTS

| | | |
|---|---|---|
| WO | 2011/123696 A1 | 10/2011 |
| WO | 2012/036787 A2 | 3/2012 |
| WO | 2012/124917 A2 | 9/2012 |

* cited by examiner

ADD-ON APPARATUS FOR SYNCHRONIZATION OF FREQUENCY DIVERSITY COMMUNICATIONS AND METHODS USEFUL IN CONJUNCTION THEREWITH

REFERENCE TO CO-PENDING APPLICATIONS

This application claims priority from Israel Patent Application No. 226509, filed 23 May 2013 and entitled: "Add-on Apparatus for Synchronization of Frequency Diversity Communications and Methods Useful In Conjunction Therewith".

FIELD OF THE INVENTION

The present invention relates generally to wireless communication systems and more particularly to transmission and reception enhancement in wireless communication systems.

BACKGROUND OF THE INVENTION

Many communication systems use a fixed center frequency. For example, some wireless cellular communication systems such as 2G (CDMA) 3G (WCDMA) and 4G (WiMax, LTE) use typically fixed center frequency for communications within the cell. Sometimes all cellular networks can be operated using a single fixed center frequency (in case of frequency reuse=1).

Wired communication systems which use a fixed center frequency are known.

Frequency diversity is a well known technique in the prior art. Frequency diversity is a known method for don't-put-all-your-eggs-in-one-basket motivated communications, since any individual fixed frequency may be plagued by noise, interference and so forth. Some protocols provide a certain level of frequency diversity which may or may not be sufficient for particular applications while others provide none.

It is known that as a communication system moves from one center frequency to another, there is a transient time period which is prone to error, typically both at the transmitter end and at the receiver end, due to the "settling time" required by the hardware to adjust to the new frequency.

A variety of frequency converters are prevalent in the art. Layer 1, 2 and 3 relays are known.

Many different communication protocols such as LTE, 3G UMTS, WiMAX, WiFi, OFDMA, CDMA and TDMA are known.

Receivers which recognize elements of a known protocol, such as cyclic prefixes, are known.

The disclosures of all publications and patent documents mentioned in the specification, and of the publications and patent documents cited therein directly or indirectly, and of specifications of mentioned protocols are hereby incorporated by reference.

SUMMARY OF THE INVENTION

Frequency diversity can be used for better channel adaptation and also for interference mitigation means. For example, in the next cellular standard after LTE, the LTE-Advanced, several carriers are used simultaneously for frequency diversity and also to achieve higher throughputs. However, supporting several concurrent channels is difficult to implement because in order to do so, one needs to have multi-channel hardware at both ends (transmitter and receiver), which is not always feasible, especially at the handset (mobile station) side. There is therefore a need to facilitate frequency diversity capability Certain embodiments seek to provide an add-on (external to the transmitter and receiver) apparatus and relevant methods, that enable the addition of frequency diversity ability to communication systems not having such ability.

Addition of frequency diversity to systems having fixed center frequency can give such systems great advantage.

Addition of the frequency diversity ability inside existing equipment (off-the-shelf) is, in most cases, complicated and costly. Facilitating this ability using an external apparatus is advantageous since it can allow using various off-the-shelf equipment (without and development efforts) from different equipment suppliers.

There is thus provided, in accordance with certain embodiments, a cellular communication system comprising at least one cellular communication network node having a capacity for communicating with at least one additional cellular communication network node at a given center frequency; and at least one external frequency converter, external to said node, operative to cause at least one cellular communication network node, from outside said node, to communicate with at least one additional cellular communication network node, on at least one occasion, according to a given cellular communication protocol, at at least one converted center frequency which differs from said given center frequency.

The node may comprise a base station and/or a mobile station.

Further in accordance with certain embodiments, the capacity for communicating comprises a transmitting capacity, and the converter comprises a Tx frequency converter.

Still further in accordance with certain embodiments, the capacity for communicating comprises a receiving capacity and the converter comprises an Rx frequency converter.

Additionally in accordance with certain embodiments the cellular communication protocol comprises LTE, WiMax or a 3G cellular communication protocol, inter alia.

Also provided, in accordance with certain embodiments, is a cellular communication method comprising providing at least one existing cellular communication network node having a capacity for communicating with at least one additional cellular communication network node at a given center frequency; and retrofitting at least one external frequency converter onto said at least one existing node externally, wherein said converter is operative to cause said at least one existing cellular communication network node, from outside said existing node, to communicate with at least one additional cellular communication network node, at least on one occasion, according to a given cellular communication protocol, at at least one converted center frequency which differs from said given center frequency.

At least the following embodiments are provided:

Embodiment 1

A wireless (e.g.) communication system comprising:
at least one typically wireless communication network node having a capacity for communicating with at least one additional typically wireless communication network node at a given center frequency; and
at least one external frequency converter, external to said node, operative to cause at least one typically wireless communication network node, from outside said node, to communicate with at least one additional typically wireless communication network node, at least on one occasion, according to a given typically wireless communication protocol, at at least one converted center frequency which differs from said given center frequency.

Embodiment 2

A system according to Embodiment 1 wherein said node comprises a base station.

Embodiment 3

A system according to Embodiment 1 wherein said node comprises a mobile station.

Embodiment 4

A system according to Embodiment 1 wherein said capacity for communicating comprises a transmitting capacity and wherein said converter comprises a Tx frequency converter.

Embodiment 5

A system according to Embodiment 1 wherein said capacity for communicating comprises a receiving capacity and wherein said converter comprises an Rx frequency converter.

Embodiment 6

A system according to Embodiment 1 wherein said wireless communication protocol comprises LTE.

Embodiment 7

A system according to Embodiment 1 wherein said wireless communication protocol comprises WiMax.

Embodiment 8

A system according to Embodiment 1 wherein said wireless communication protocol comprises a 3G cellular communication protocol.

Embodiment 9

A typically wireless communication method comprising:
providing at least one existing wireless communication network node having a capacity for communicating with at least one additional cellular communication network node at a given center frequency; and
retrofitting at least one external frequency converter onto said at least one existing node externally, wherein said converter is operative to cause said at least one existing wireless communication network node, from outside said existing node, to communicate with at least one additional typically wireless communication network node, at least on one occasion, according to a given typically wireless communication protocol, at at least one converted center frequency which differs from said given center frequency.

Embodiment 10

A typically wireless communication system comprising:
at least one typically wireless communication network node having a capacity for communicating with at least one additional typically wireless communication network node at a given center frequency and according to a given typically wireless communication protocol; and
at least one external frequency converter, external to said node, said converter shifting the transmitted signal of said at least one typically wireless network node from said given center frequency to an alternative center frequency, said alternative center frequency being changed from time to time during the communication between said at least one typically wireless communication network node and said at least one additional typically wireless communication network node.

Embodiment 11

A system according to Embodiment 10 wherein said alternative center frequency is changed periodically every predetermined time interval.

Embodiment 12

A system according to Embodiment 10 wherein said alternative center frequency is taken from a predetermined set of frequencies.

Embodiment 13

A system according to Embodiment 10 wherein said alternative center frequency is computed by the external frequency converter.

Embodiment 14

A system according to Embodiment 10 wherein said alternative center frequency is configured by means external to said external frequency converter.

Embodiment 15

A system according to Embodiment 10 wherein said external frequency converter comprises a synchronization detector, operative to detect predetermined portion of the signal of said communication protocol, and to synchronize said change in said alternative center frequency during said detected portion of the signal.

Embodiment 16

A system according to Embodiment 10 wherein said communication protocol comprises LTE cellular communication protocol.

Embodiment 17

A system according to Embodiment 10 wherein said communication protocol comprises 3G cellular communication protocol.

Embodiment 18

A system according to Embodiment 10 wherein said communication protocol comprises WiMAX cellular communication protocol.

Embodiment 19

A system according to Embodiment 10 wherein said communication protocol comprises OFDM communication protocol.

Embodiment 20

A system according to Embodiment 10 wherein said communication protocol comprises OFDMA communication protocol.

Embodiment 21

A system according to Embodiment 15 and also to Embodiment 19, wherein said predetermined portion is a Cyclic Prefix of an OFDM symbol.

Embodiment 22

A system according to Embodiment 15 and also to Embodiment 20, wherein said predetermined portion is a Cyclic Prefix of an OFDMA symbol.

Embodiment 23

A system according to Embodiment 15, wherein said predetermined portion is a GAP between successive frames of said communication protocol.

Embodiment 24

A system according to Embodiment 15, wherein said communication protocol is a Time Division Duplex (TDD) protocol, and wherein said predetermined portion is a GAP between the uplink subframe and the downlink subframe of said communication protocol.

Embodiment 25

A system according to Embodiment 1 wherein said node has both transmitting and receiving capacities and said converter comprises both Tx and Rx frequency conversion functionalities.

Embodiment 26

A system according to Embodiment 1 wherein a plurality of frequency converters are provided for a corresponding plurality of nodes and wherein all of said plurality of frequency converters operate synchronously such that each time one of said plurality of frequency converters changes its corresponding node's current center frequency to a new value, all of said plurality of frequency converters change their respectively corresponding nodes' current center frequencies to said new value.

Embodiment 27

A system according to Embodiment 1 wherein a plurality of frequency converters are provided for a corresponding plurality of nodes and wherein all of said plurality of frequency converters operate synchronously such that each time one of said plurality of frequency converters changes its corresponding node's current center frequency to a new value, all of said plurality of frequency converters change their respectively corresponding nodes' current center frequencies to said new value.

Embodiment 28

A system according to Embodiment 1 wherein a plurality of frequency converters are provided for a corresponding plurality of nodes and wherein all of said plurality of frequency converters operate at least partly non-synchronously, thereby to reduce mutual interference between the plurality of frequency converters' respective corresponding nodes, such that when at least one of said plurality of frequency converters changes its corresponding node's current center frequency to a new value, less than all of said plurality of frequency converters change their respectively corresponding nodes' current center frequencies to said new value.

Embodiment 29

A system according to Embodiment 13 wherein a plurality of frequency converters are provided for a corresponding plurality of nodes and wherein all of said plurality of frequency converters operate at least partly non-synchronously, thereby to reduce mutual interference between the plurality of frequency converters' respective corresponding nodes, such that when at least one of said plurality of frequency converters changes its corresponding node's current center frequency to a new value, less than all of said plurality of frequency converters change their respectively corresponding nodes' current center frequencies.

Embodiment 30

A typically wireless communication system comprising:
at least one typically wireless communication network node having a capacity for communicating with at least one additional typically wireless communication network node at a given center frequency and according to a given typically wireless communication protocol; and
at least one external frequency converter, external to said node, said converter shifting the received signal of said at least one typically wireless network node from an alternative center frequency to said given center frequency, wherein said alternative center frequency is changed from time to time during communication between said at least one wireless communication network node and said at least one additional typically wireless communication network node.

Embodiment 31

A system according to Embodiment 30 wherein said alternative center frequency is changed periodically every predetermined time interval.

Embodiment 32

A system according to Embodiment 30 wherein said alternative center frequency is taken from a predetermined set of frequencies.

Embodiment 33

A system according to Embodiment 30 wherein said alternative center frequency is computed by the external frequency converter.

Embodiment 34

A system according to Embodiment 30 wherein said alternative center frequency is configured by means external to said external frequency converter.

Embodiment 35

A system according to Embodiment 30 wherein said external frequency converter comprises a synchronization detector, operative to detect predetermined portion of the signal of said communication protocol, and to synchronize said change in said alternative center frequency during said detected portion of the signal.

Embodiment 36

A system according to Embodiment 30 wherein said communication protocol comprises LTE cellular communication protocol.

Embodiment 37

A system according to Embodiment 30 wherein said communication protocol comprises 3G cellular communication protocol.

Embodiment 38

A system according to Embodiment 30 wherein said communication protocol comprises WiMAX cellular communication protocol.

Embodiment 39

A system according to Embodiment 30 wherein said communication protocol comprises OFDM communication protocol.

Embodiment 40

A system according to Embodiment 30 wherein said communication protocol comprises OFDMA communication protocol.

Embodiment 41

A system according to Embodiment 35 and also to Embodiment 39, wherein said predetermined portion is a Cyclic Prefix of an OFDM symbol.

Embodiment 42

A system according to Embodiment 35 and also to Embodiment 40, wherein said predetermined portion is a Cyclic Prefix of an OFDMA symbol.

Embodiment 43

A system according to Embodiment 35, wherein said predetermined portion is a GAP between successive frames of said communication protocol.

Embodiment 44

A system according to Embodiment 35, wherein said communication protocol is a Time Division Duplex (TDD) protocol, and wherein said predetermined portion is a GAP between the uplink subframe and the downlink subframe of said communication protocol.

Embodiment 45

A system according to Embodiment 1 wherein said converter is operative to cause said node to communicate at a selected converted center frequency from among a finite range of converted center frequency values.

Embodiment 46

A system according to Embodiment 1 wherein at least first and second frequency converters are provided for corresponding first and second nodes and wherein said frequency converters operate orthogonally such that, at least once, said first frequency converter changes the first node's current center frequency from an existing value to a value equal to that of the second node's center frequency's current value and said second frequency converter changes the second node's existing center frequency value to a value which equals said existing value.

BRIEF DESCRIPTION OF THE DRAWINGS

Certain embodiments of the present invention are illustrated in the following drawings:

FIG. 7a shows the system before using the RFC+Transmission Frequency Converter (TFC) and FIG. 7b shows the same system after using the RFC+TFC.

FIG. 8a is an example implementation of the Transmission Frequency Converter (TFC) portion of the add-on frequency diversity apparatus; and FIG. 9a depicts a block diagram of an example implementation of the Reception Frequency Converter (RFC) portion of the add-on frequency diversity apparatus.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or an information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1A:
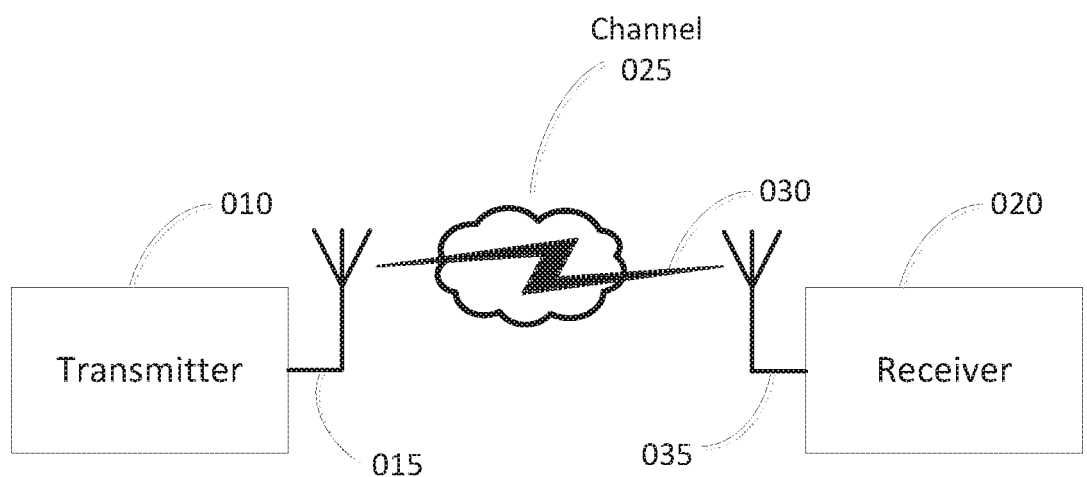
FIG. 1a (Prior Art) depicts a wireless (typically) communication system comprising a transmitter and a receiver.

FIG. 1a (Prior Art) depicts a typical wireless communication system comprising a transmitter 010 having a transmitting antenna 015, which transmits a wireless signal 030 through a channel 025. The wireless signal is then received using a receiving antenna 035 by a receiver 020.

Figure 1B:
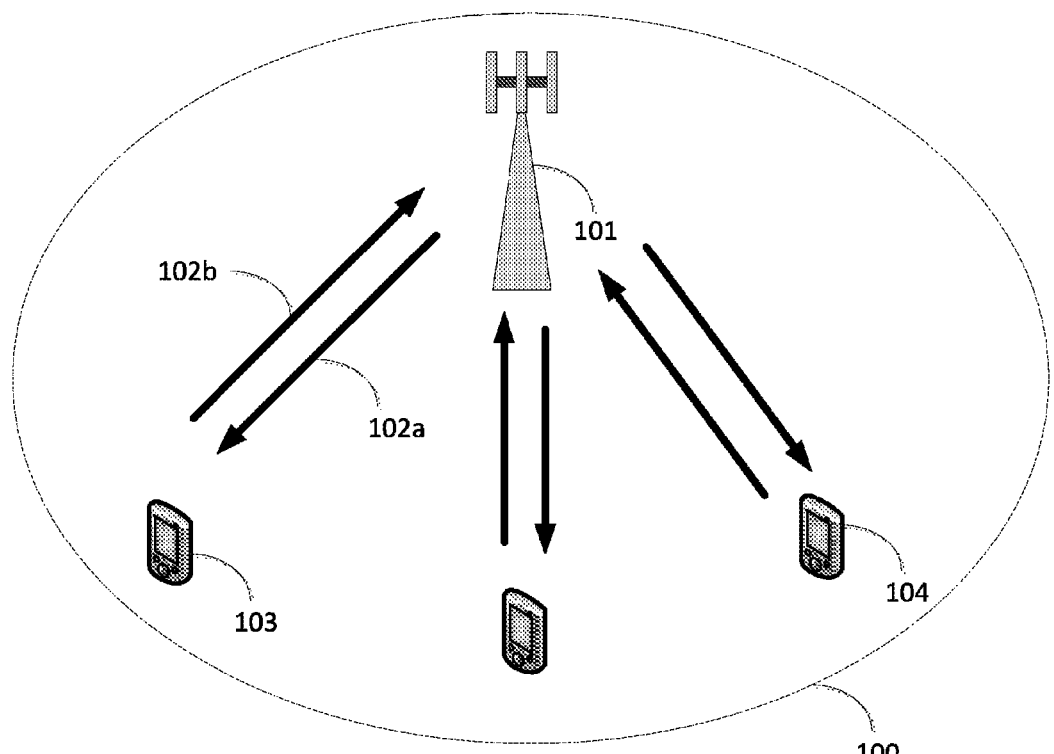
FIG. 1b depicts a typical cell or other network portion in a wireless e.g. cellular communication system.

FIG. 1b depicts a typical cell or other network portion in a wireless e.g. cellular communication system.

This embodiment typically includes a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station transmits an Uplink signal 102b to base station 101, and receives a Downlink signal 102a from base station 101. The communication system may be a cellular system, or alternatively any other wireless (e.g.) network.

The wireless (e.g.) communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102a and Uplink 102b signals may be transmitted using TDMA, CDMA, FDMA, OFDMA, or any other method or combination of methods.

Figure 1C:
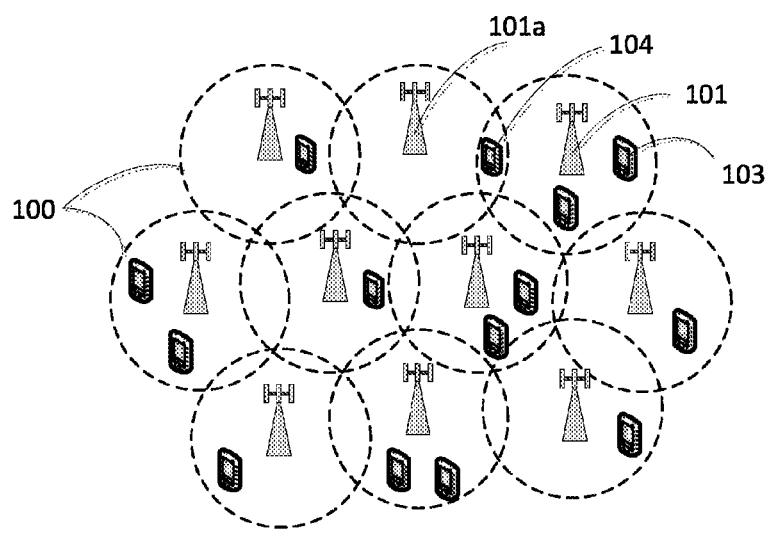
FIG. 1c depicts a cellular system comprising a plurality of cells; each of the cells e.g. as described above with reference to FIG. 1b.

FIG. 1c depicts a cellular system comprising a plurality of cells, each of which is described above with reference to FIG. 1b.

This embodiment typically includes a cellular system comprising a plurality of cells 100, each of which is described above with reference to FIG. 1b. Some of the mobile stations may receive the downlink signals from their serving base stations in low quality. Such low quality signals may be caused by multipath, fading, inter-cell interferences, attenuation, or any other cause or combination of such. In such conditions, it is difficult for the mobile station to maintain proper reception of the downlink signals from the base station.

For example, in one of the cells, base station 101 serves the mobile stations 103 and 104, amongst other mobile stations. Mobile station 104 also happens to reside within the geographical coverage area of base station 101a; therefore Mobile station 104 receives downlink signals from 2 base stations 101 and 101a, which causes lower quality reception of the desired downlink signal from base station 101.

Typically, in a cellular or wireless communication system, some of the downlink transmissions may include portions which are more critical than other portions. Such critical portions are referred to as "Critical Regions" herein below. One example of a Critical Region is downlink synchronization signals, which are critical for the proper reception of the remaining downlink transmission. Another example is control and management messages, such as but not limited to, for example, the DL-MAP signal in WiMAX protocol, the PDCCH signal in LTE protocol, and CCPCH signal in 3G UMTS protocol, that the base station sends to the mobile stations; such control and management messages may be critical for proper reception of the downlink transmission.

Another example of a Critical Region is a portion of a downlink signal addressed to a mobile station which receives the downlink transmission in low quality, e.g. as described above. Another example is a portion of a downlink signal addressed to a mobile station which is a preferred mobile station (e.g. has greater importance or higher priority over the other mobile stations).

Such Critical Regions may vary from time to time, or from frame to frame. Such variations may be for example in the content (information) carried by the critical region, or in the critical region allocation within the frame.

Alternatively, the Critical Regions may be fixed, either by their content or by their allocation. Further alternatively, they may vary slowly, for example be fixed for several consecutives frames and then be changed.

Figure 6:
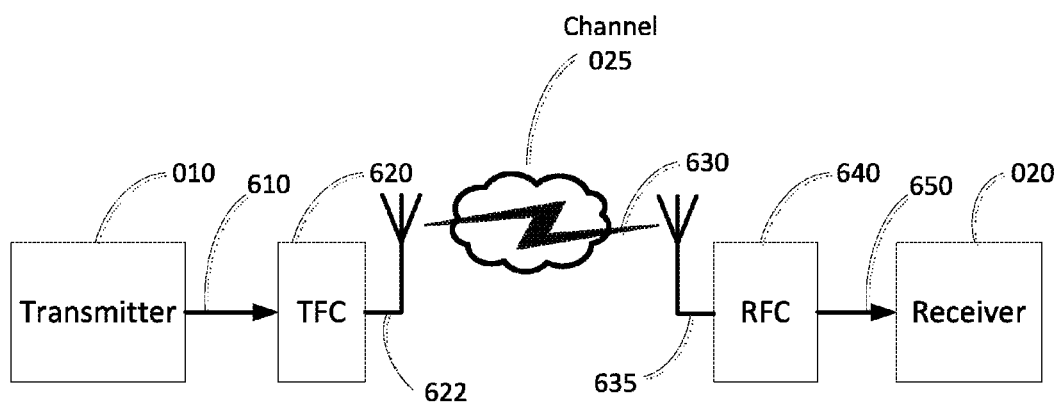
FIG. 6 depicts a wireless (e.g.) communication system incorporating an add-on frequency diversity couple apparatuses at the transmitter side (TFC) and at the receiver side (RFC).

FIG. 6 depicts a wireless (e.g.) communication system incorporating an add-on frequency diversity couple apparatuses at the transmitter 010 side (Transmission Frequency Converter (TFC) 620) and at the receiver 020 side (Reception Frequency Converter (RFC) 640) according to an embodiment of the present invention.

Transmitter 010 resides in a typically wireless communication network node, e.g. 101, 103 or 104 of FIG. 1b. Receiver 020 resides in an additional typically wireless communication network node. For example, transmitter 010 may reside in mobile node 103 and receiver 020 may reside in base station 101. Typically, transmitter 010 has the capacity to communicate with receiver 020 over channel 025 according to a given communication protocol, e.g. LTE, WiMAX, WiFi, 3G cellular, Bluetooth, etc. The communication protocol may optionally be an OFDM, OFDMA, CDMA, TDMA, FDMA protocol. Typically, transmitter 010 has the capacity to communicate with receiver 020 at a given ("original") center frequency.

At the transmitter side a Transmission Frequency Converter (TFC) 620 is added. The interface 610 between the transmitter 010 and the Transmission Frequency Converter (TFC) 620 may be optionally at the RF frequency (e.g. the prior antenna interface at high power or at the RF frequency at low power before the power amplifier). Optionally it may be implemented at the IF (intermediate frequency). Optionally it may be implemented at the base-band. At the receiver side, a Receiver Frequency Converter (RFC) 640 is added. Accordingly the interface between the Reception Frequency Converter (RFC) 640 and the receiver 020 may be optionally in all the alternatives as described above e.g. with reference to the Transmission Frequency Converter (TFC) 620. The main function of the Transmission Frequency Converter (TFC) is to convert the original center frequency of the signal transmitted by the transmitter 010 to a shifted center frequency (also referred to as "alternative center frequency"). The Transmission Frequency Converter (TFC) 620 is then connected to a transmitting antenna 622 that covers all the shifted frequencies that are implemented by the TFC. Optionally, additional components may be added between the Transmission Frequency Converter (TFC) and the antenna, e.g. a PA (Power Amplifier) and/or filter/s. In a similar manner the receiving antenna 635 also covers all the shifted frequencies, following which it is interfaced to the Reception Frequency Converter (RFC) 640 which re-converts the shifted center frequency to the original center frequency. Thereafter the signal 650 which has the original center frequency is received correctly by the receiver 020. Optionally, additional components may be added between the Reception Frequency Converter (RFC) and the antenna, e.g. a LNA (Low Noise Amplifier) and/or filter/s.

Typically, Transmitter 010 and Receiver 020 are standard apparatuses, and may be off-the-shelf equipment capable to communicate with each other.

Typically, the frequency conversion (shift) varies in time, such that a different frequency shift is performed by the Transmission Frequency Converter (TFC) and Reception Frequency Converter (RFC) along with time, e.g. the alternative center frequency is changed from time to time during the communication between the receiver 020 and the transmitter 010. Optionally, a new frequency shift is performed periodically every predetermined time interval. Optionally, a new frequency shift is performed non-periodically, according to a predetermined control. Optionally, a new frequency shift is performed during non-critical regions of the transmission, thus minimizing the interference and the degradation to the received transmission. Examples for placing a frequency shift at non critical regions of the transmission is further described e.g. with reference to FIGS. 2-5 below.

Optionally, the frequency shift is taken from a predetermined set e.g. list of frequency shifts. Further optionally, the frequency shift is selected consecutively from said list. Alternatively, the frequency shift is taken or configured from an external system. Alternatively, the frequency shift is computed according to a predetermined algorithm which is suitable to the application.

Figure 7A:
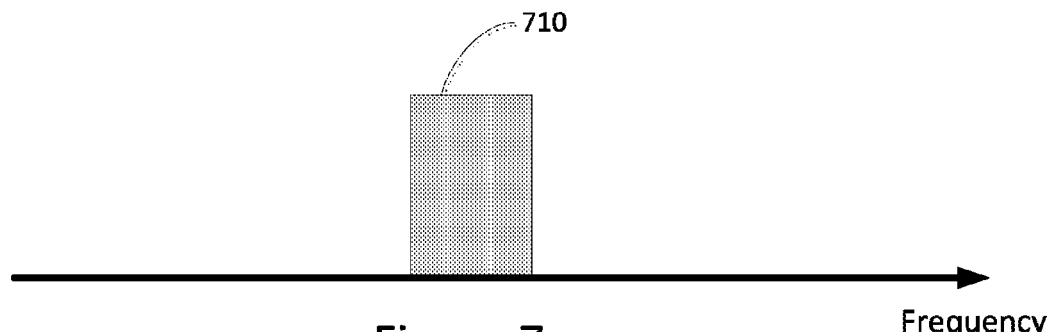
FIGS. 7a-7b are simplified illustrations of the frequency behavior effect when using the add-on frequency diversity apparatuses (RFC+TFC). In particular.
Figure 7B:
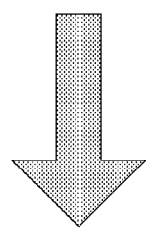

FIGS. 7a-7b are simplified illustrations of the frequency behavior effect when using the add-on frequency diversity apparatuses (RFC+TFC). FIG. 7a (Prior art) shows the situation before using the RFC+TFC. It may be seen that the original center frequency 710 is static in the frequency domain.

FIG. 7b shows the situation after using the RFC+TFC, according to an embodiment of the present invention. It actually shows an example of the shifted center frequencies. It may be seen that the shifted center frequency is shifted to different center frequencies along time. In time period=1 (T=1) 720 the shifted center frequency is F1. In time period=2 (T=2) 760 the shifted center frequency is F5. In time period=3 (T=3) 730 the shifted center frequency is F2. In time period=4 (T=4) 740 the shifted center frequency is F3. In time period=5 (T=5) 750 the shifted center frequency is F4.

Figure 2A:
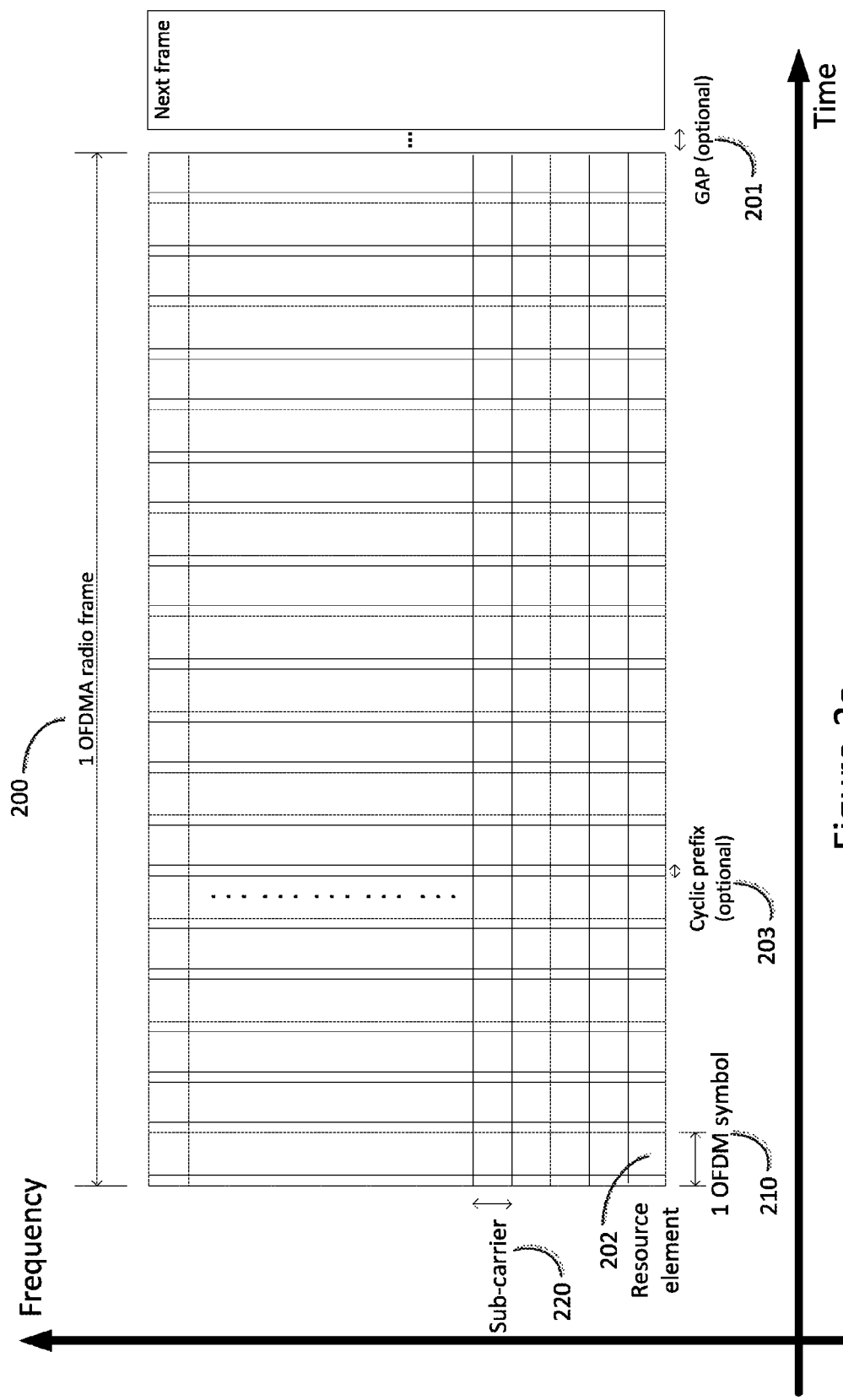
FIG. 2a depicts an OFDMA radio frame (either downlink or uplink), in an OFDMA Frequency Division Duplex (FDD) communication system implementing add-on frequency diversity according to certain embodiments of the invention.

FIG. 2a depicts an OFDMA/OFDM radio frame 200 (either downlink or uplink), in an OFDMA Frequency Division Duplex (FDD) communication system implementing add-on frequency diversity according to certain embodiments of the invention.

This embodiment typically includes an OFDMA (or OFDM) radio downlink frame 200, in an OFDMA (or OFDM) communication system. Frame 200 comprises a plurality of OFDM symbols 210 in the time domain, and a plurality of subcarriers 220 in the frequency domain. An optional Gap 201 may be placed between successive frames 200. An optional Cyclic Prefix 203 may be provided between successive OFDM symbols in the time domain A basic resource which may be allocated in the downlink transmission frame is resource element 202, which is the transmission of one subcarrier during one OFDM symbol length in time.

Figure 7B:
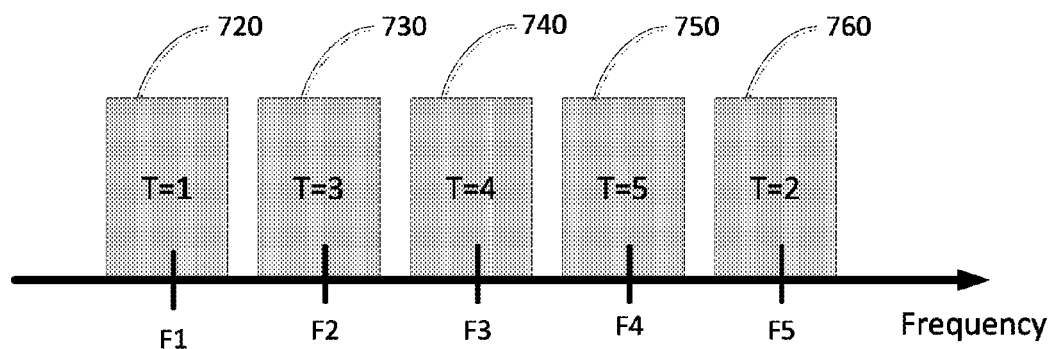

In the OFDMA (or OFDM) frame 200 there are various places (e.g. portions, regions, or locations in the time domain, or combinations thereof) that the frequency conversion/shift, e.g. as described above with reference to FIGS. 6-7, may be realized. Each of these places implements a different frequency shift rate. For example, the frequency shift may be performed during the cyclic prefix (CP) 203 of an OFDM/OFDMA symbol 210. It may also be performed during the Cyclic Prefix (CP) of every symbol or during the Cyclic Prefix (CP) of every few symbols. Alternatively, the frequency shift may be effected during un-important symbol duration (or during an empty symbol—a symbol time that no data is transmitted). Alternatively it may be effected during the time gap 201 between consecutive frames. Each of the above examples may be regarded as a "non-critical region" of the transmission, in that improper reception of these regions is not as harmful to the receiver as other (critical) regions.

In another embodiment of the present invention which includes an OFDMA radio frame, in an OFDMA TDD (Time Division Duplex) communication system implements add-on frequency diversity according to certain embodiments of the invention. In the Time Division Duplex (TDD) system, both DL (downlink) and UL (uplink) frames occupy the same frequency (center frequency) and are transmitted alternately. Between each one of these two frames there are guard gaps (between DL and UL, and between UL and DL). In each one of these guard gaps, frequency conversion/shift, realizing the frequency diversity, may be effected. In this implementation the rate of the conversions is therefore the frames' shift rate. Typically, all locations in the frame described in FIG. 2a may also be used in the Time Division Duplex (TDD) system.

Figure 3A:
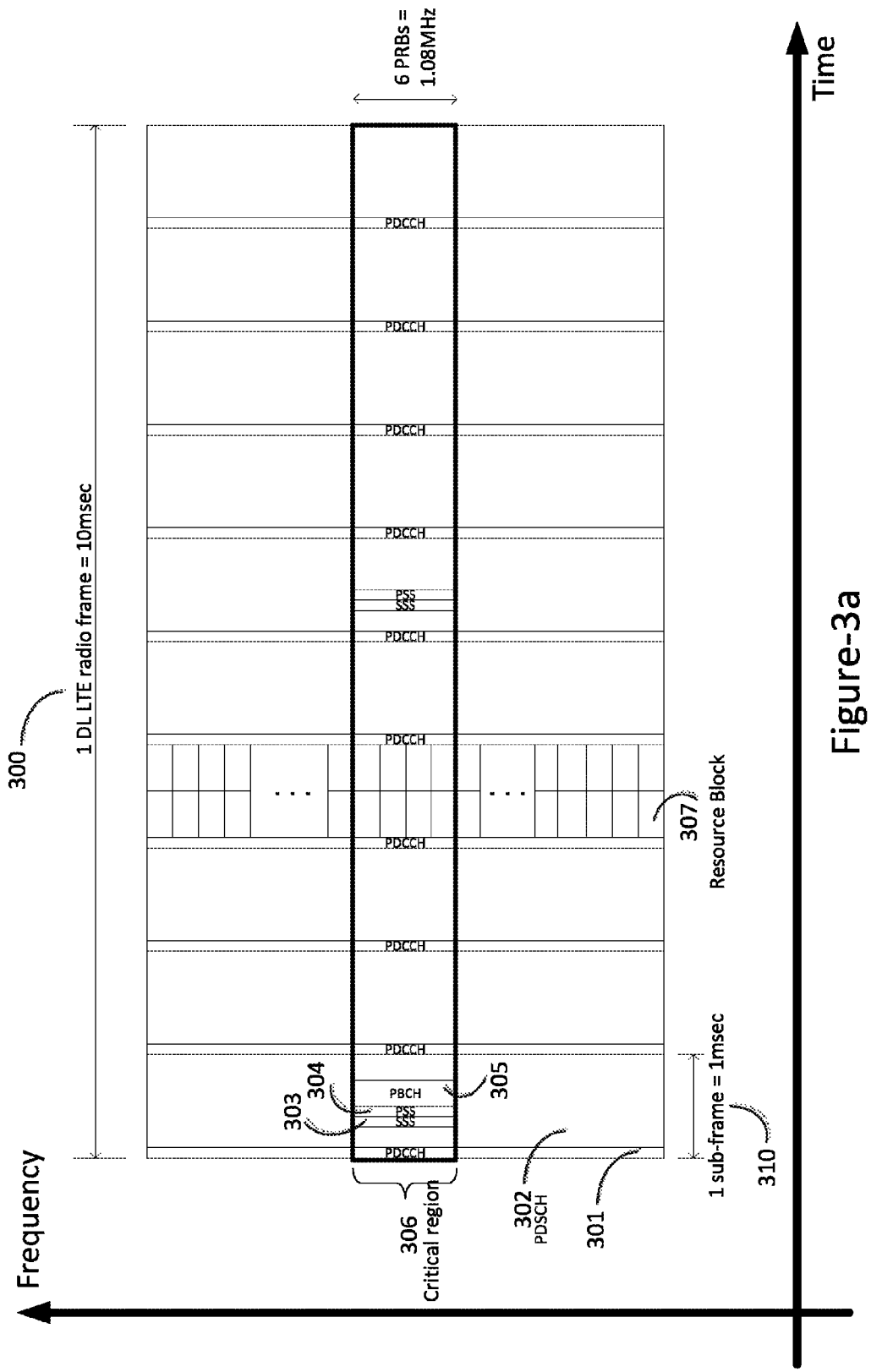
FIG. 3a depicts LTE Frequency Division Duplex (FDD) radio frame (either downlink or uplink) implementing add-on frequency diversity according to embodiments of the invention.

FIG. 3a depicts LTE Frequency Division Duplex (FDD) radio frame (either downlink or uplink) implementing add-on frequency diversity according to embodiments of the invention. The embodiment of FIG. 3a illustrates an LTE radio downlink (DL) frame 300 which has a duration of, say, 10 msec, in an LTE cellular communication system. Frame 300 comprises a plurality of LTE physical resource blocks (PRBs) 307 which may be a subset of 6 OFDMA symbols in time and 12 subcarriers in frequency. The DL (downlink) frame also comprises LTE sub-frames such as that shown at reference numeral 310 (its duration is, say, 1 msec). The LTE DL (downlink) frame in the illustrated embodiment, is of the FDD (Frequency Division Duplex) type, however TDD (Time Division Duplex) type of DL (downlink) frames may be employed similarly.

As shown, the LTE DL (downlink) frame may include up to several physical channels or signals e.g some or all of: Physical DL (downlink) Control Channel (PDCCH) 301, Physical DL (downlink) Shared Channel (PDSCH) 302, Secondary Synchronization Signal (SSS) 303, Primary Synchronization Signal (PSS) 304 and Physical Broadcast Channel (PBCH) 305. Each of these channels or signals or any subset thereof may be deemed "critical" to an LTE system operation.

Since LTE Frequency Division Duplex (FDD) is OFDMA then the locations for the frequency shift in the frame that were described above, e.g. with reference to FIG. 2a, may also be used in the LTE Frequency Division Duplex (FDD) system.

A further embodiment of the present invention includes an LTE Time Division Duplex (TDD) radio frame implementing add-on frequency diversity. Since LTE Time Division Duplex (TDD) is OFDMA then all the locations for the frequency shift in the frame that were described above e.g. with reference to OFDMA Time Division Duplex (TDD) may also be used in the LTE Time Division Duplex (TDD) system.

Figure 4A:
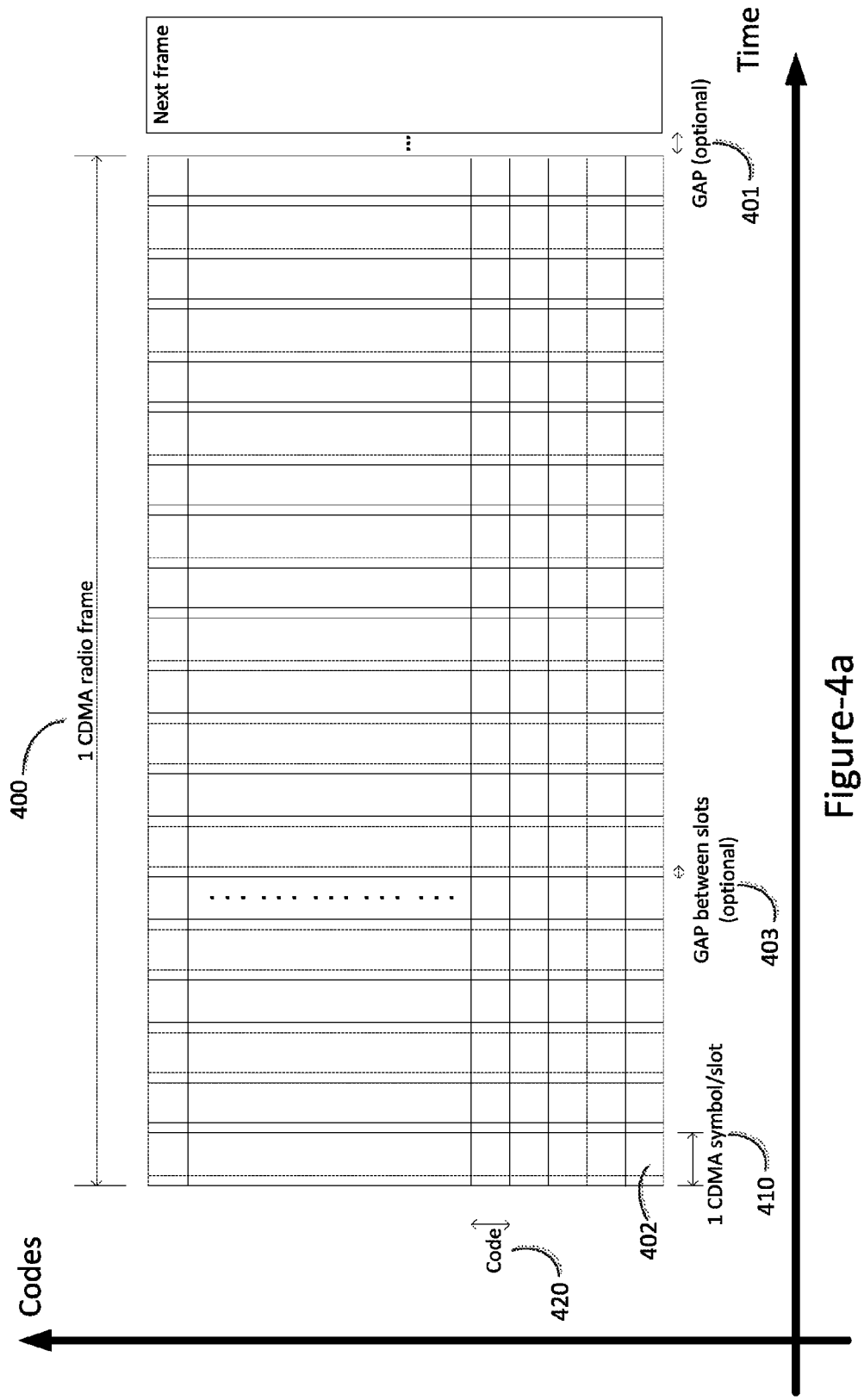
FIG. 4a depicts a CDMA Frequency Division Duplex (FDD) radio frame (either downlink or uplink), in a CDMA communication system implementing add-on frequency diversity according to certain embodiments of the invention.

FIG. 4a depicts a CDMA Frequency Division Duplex (FDD) radio frame (either downlink or uplink), in a CDMA communication system implementing add-on frequency diversity according to certain embodiments of the invention. In the CDMA frame 400 there are several places/portions (in the time domain) that the frequency conversion/shift may realize. Each of these places implements a different frequency shift rate. For example, the frequency shift may be effected during the gap between slots/symbols 403 of a CDMA symbol/slot 410. It may be effected every symbol/slot or every several symbols/slots. Alternatively, the frequency shift may be effected during un-important symbol/slot duration (or during an empty symbol/slot—a symbol/slot time that no data is transmitted). Alternatively it may be effected during the time gap 401 between consecutive frames. Each of the above examples may be regarded as a "non-critical region" of the transmission, in that improper reception of these regions is not as harmful to the receiver as other (critical) regions.

In another embodiment of the present invention which includes a CDMA Time Division Duplex (TDD) radio frame, a CDMA communication system implements add-on frequency diversity according to certain embodiments of the invention. In the Time Division Duplex (TDD) system, both DL (downlink) and UL (uplink) frames occupy the same frequency (center frequency) and are transmitted alternately. Between each one of these two frames there are guard gaps (between DL and UL, and between UL and DL). In each one of these guard gaps frequency conversion/shift realizing the frequency diversity may be effected. In this implementation the rate of the conversions is therefore the frames' shift rate. All locations in the frame that were described in FIG. 4a may also be used in the Time Division Duplex (TDD) system.

Figure 5:
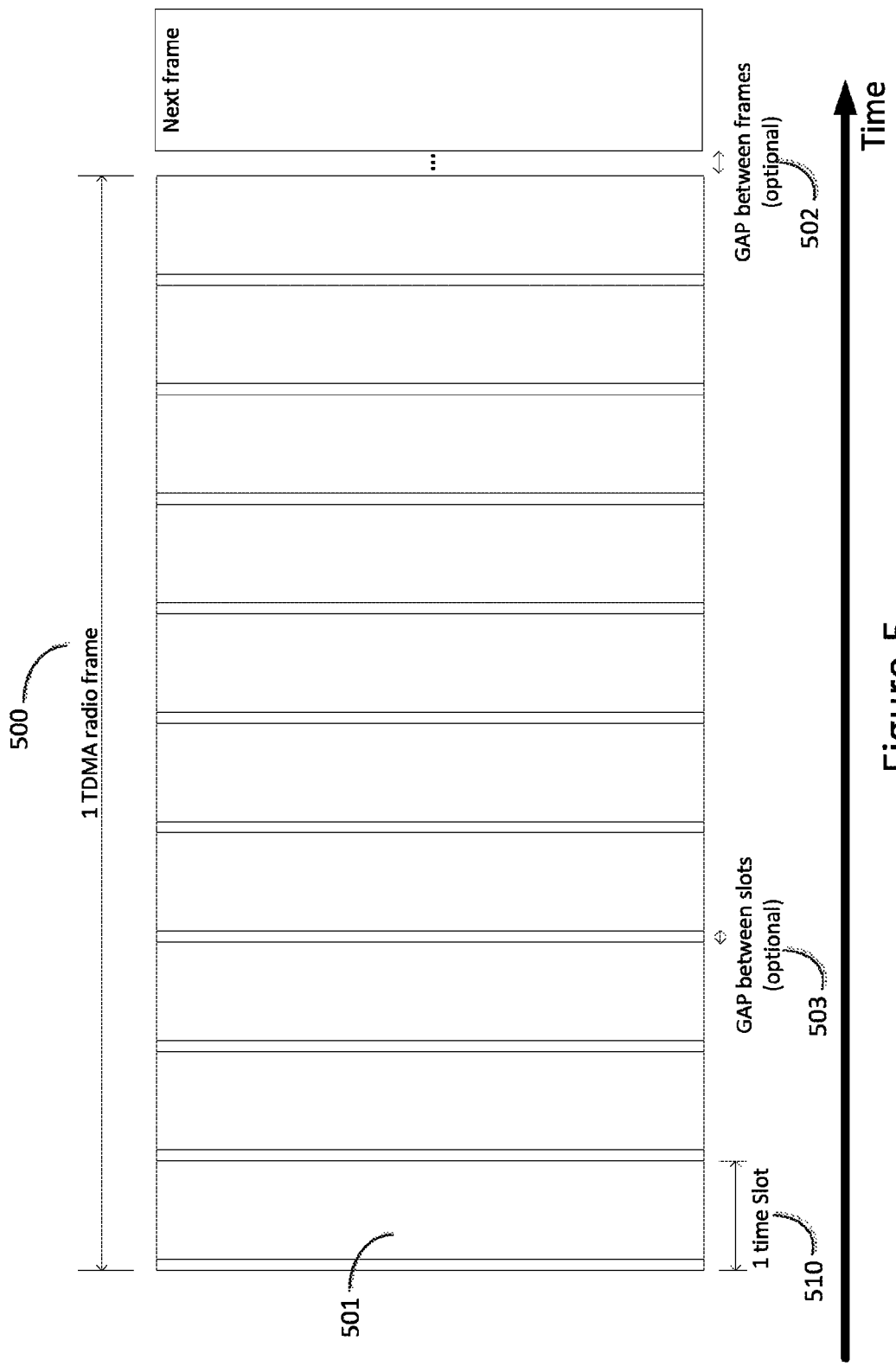
FIG. 5 depicts a TDMA radio frame, in a TDMA communication system implementing add-on frequency diversity according to certain embodiments of the invention.

FIG. 5 depicts a TDMA radio frame, in a TDMA communication system implementing add-on frequency diversity according to certain embodiments of the invention. In the TDMA frame 500 there are several places (in the time domain) that the frequency conversion/shift may be realized. Each of these places implements a different frequency shift rate. For example, the frequency shift may be effected during the gap between slots 503 of a TDMA symbol 510. It may be effected every slot or every several slots. Alternatively, the frequency shift may be effected during un-important slot duration (or during an empty slot—a slot time that no data is transmitted). Alternatively it may be effected during the time gap 501 between consecutive frames. Each of the above examples may be regarded as a "non-critical region" of the transmission, in that improper reception of these regions is not as harmful to the receiver as other (critical) regions.

Figure 8:
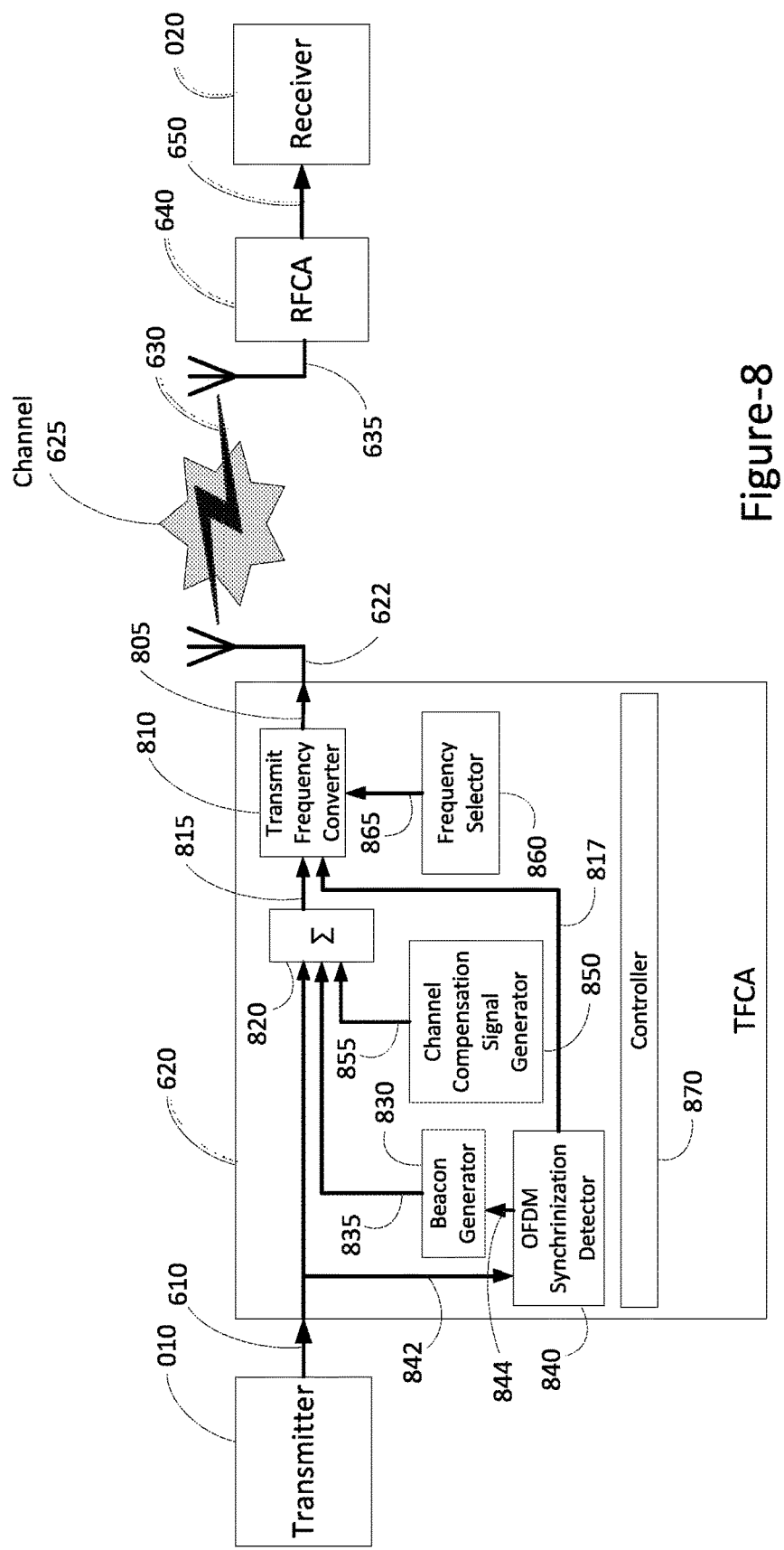
FIGS. 8, 9 are diagrams of systems useful for providing and/or utilizing Add-on Synchronization functionality for Frequency Diversity Communications, in accordance with certain embodiments.
Figure 8A:
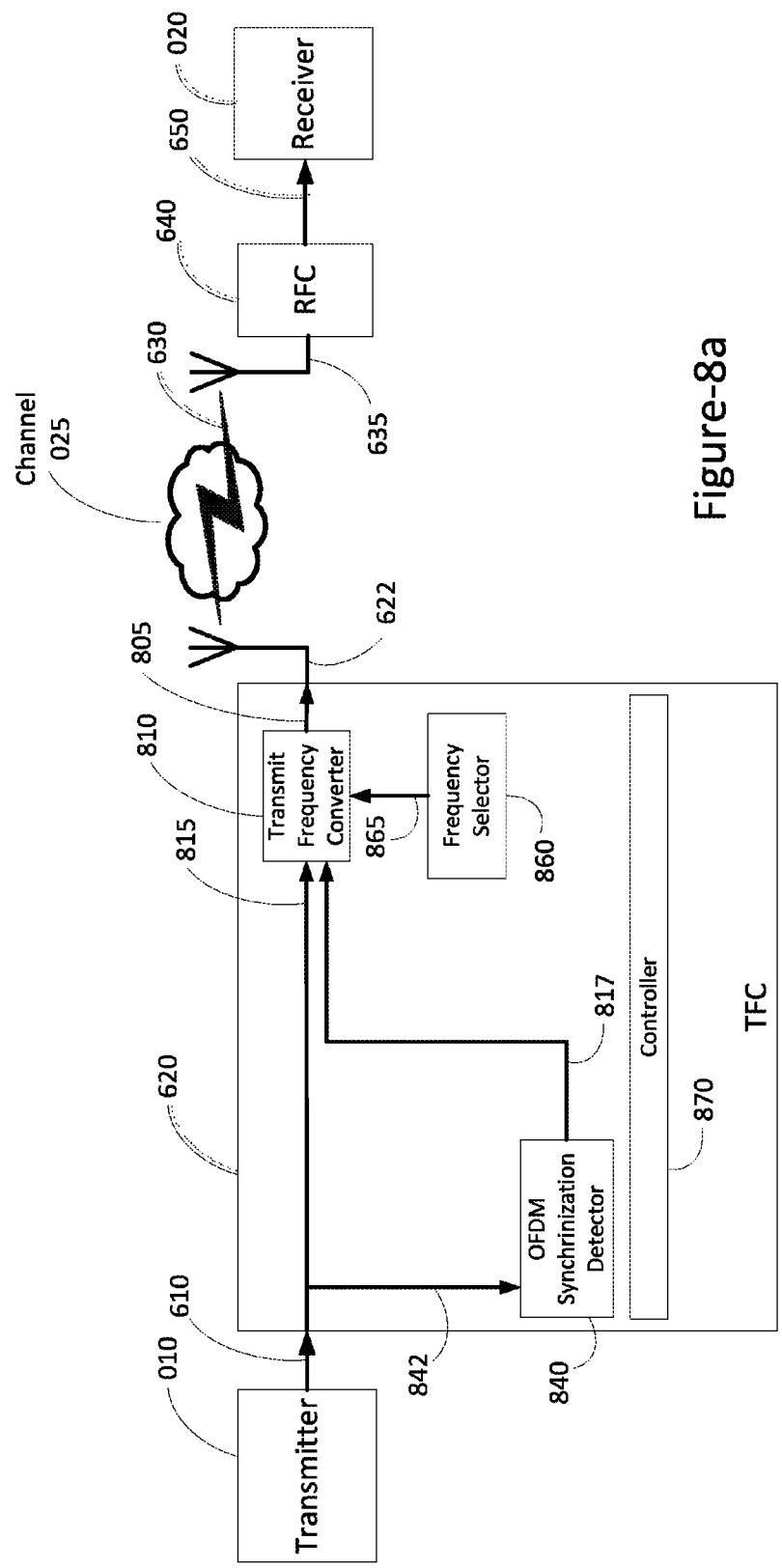
FIGS. 8a, 9a are block diagrams of apparatus which, in a wireless (e.g.) communication system comprising at least one typically wireless communication network node having a capacity for communicating with at least one additional wireless communication network node at a given center frequency and according to a given typically wireless communication protocol; and at least one external frequency converter, external to said node, said converter shifting the transmitted signal of said at least one wireless network node from said given center frequency to an alternative center frequency, wherein said alternative center frequency is changed from time to time during the communication between said at least one typically wireless communication network node and said at least one additional typically wireless communication network node, is advantageous inter alia because the external frequency converter comprises a synchronization detector, operative to detect a predetermined portion of the signal of said communication protocol, and to synchronize said change in said alternative center frequency during said detected portion of the signal. In particular.

FIG. 8a depicts a more detailed block diagram of an example of the Transmission Frequency Converter (TFC) portion of the add-on frequency diversity apparatus, according to a further embodiment of the present invention. In this embodiment, Transmission Frequency Converter (TFC) 620 comprises some or all of the following, suitably coupled e.g. as shown: a synchronization detector 840, a transmit frequency converter 810, and optionally a frequency selector 860. In the case of an OFDM communication protocol, synchronization detector 840 is an OFDM synchronization detector, as depicted in FIG. 8a, operative to detect predetermined portions of the OFDM signal. Alternatively, in the case of a CDMA communication protocol, synchronization detector 840 is a CDMA synchronization detector, operative to detect predetermined portions of the CDMA signal. Alternatively, according to the communication protocol, synchronization detector 840 is operative to detect predetermined portions of the relevant communication protocol signal.

Typically, synchronization detector 840 is operative to detect predetermined portions of the relevant communication protocol signal in which the frequency conversion/shift may be realized, e.g. as described above e.g. with reference to FIGS. 2-7. Typically, upon detection of said predetermined portion, the synchronization detector 840 synchronizes the transmit frequency converter 810 to perform a change in the alternative center frequency, e.g. to perform a change in the active frequency shift. Transmit frequency converter 810 is the actual component that performs the frequency conversion. The new alternative center frequency may optionally be determined by a frequency selector 860. Further optionally, a controller 870 resides in Transmission Frequency Converter (TFC) 620, for controlling the operation of its process. Optionally, the change in the alternative center frequency is made upon several consecutive detections of said predetermined portion. Further optionally, the change in the alternative center frequency is determined by predefined criteria taking into account the detection of said predetermined portion.

Optionally, said predetermined portions of the signal, in which the frequency conversion/shift may be realized, are "non-critical regions" of the transmission, in that improper reception of these portions/regions is not as harmful to the receiver as other (critical) regions. Examples of such portions/regions are described above e.g. with reference to FIGS. 2-5, and also hereinbelow. Some examples of the operation of the synchronization detector 840 are:

a. In the case of a OFDM or OFDMA communication protocol, the synchronization detector 840 may be operative to detect the Cyclic Prefix (CP) of the OFDM/OFDMA symbols, and to synchronize the transmit frequency converter 810 to perform a change in the alternative center frequency during transmission of the Cyclic Prefix (CP).

b. In the case of a frame-based communication protocol, where a GAP or some guard period is placed between successive frames, the synchronization detector 840 may be operative to detect said GAP or guard period, and to synchronize the transmit frequency converter 810 to perform a change in the alternative center frequency during said GAP or guard period.

c. In the case of a Time Division Duplex (TDD) communication protocol, where a GAP or some guard period is placed between the uplink subframe and the downlink subframe, the synchronization detector 840 may be operative to detect said GAP or guard period, and to synchronize the transmit frequency converter 810 to perform a change in the alternative center frequency during said GAP or guard period.

d. In the case of a frame-based communication protocol, where an empty region (e.g. empty symbol as described above) is placed within the frames, the synchronization detector 840 may be operative to detect said empty region, and to synchronize the transmit frequency converter 810 to perform a change in the alternative center frequency during said empty region.

e. In the case of a frame-based communication protocol, where a preamble or other known signal is placed within the frame, the synchronization detector 840 may be operative to detect the preamble or other known signal, and to synchronize the transmit frequency converter 810 to perform a change in the alternative center frequency during non-critical regions (e.g. un-important symbol duration as described above).

Figure 9:
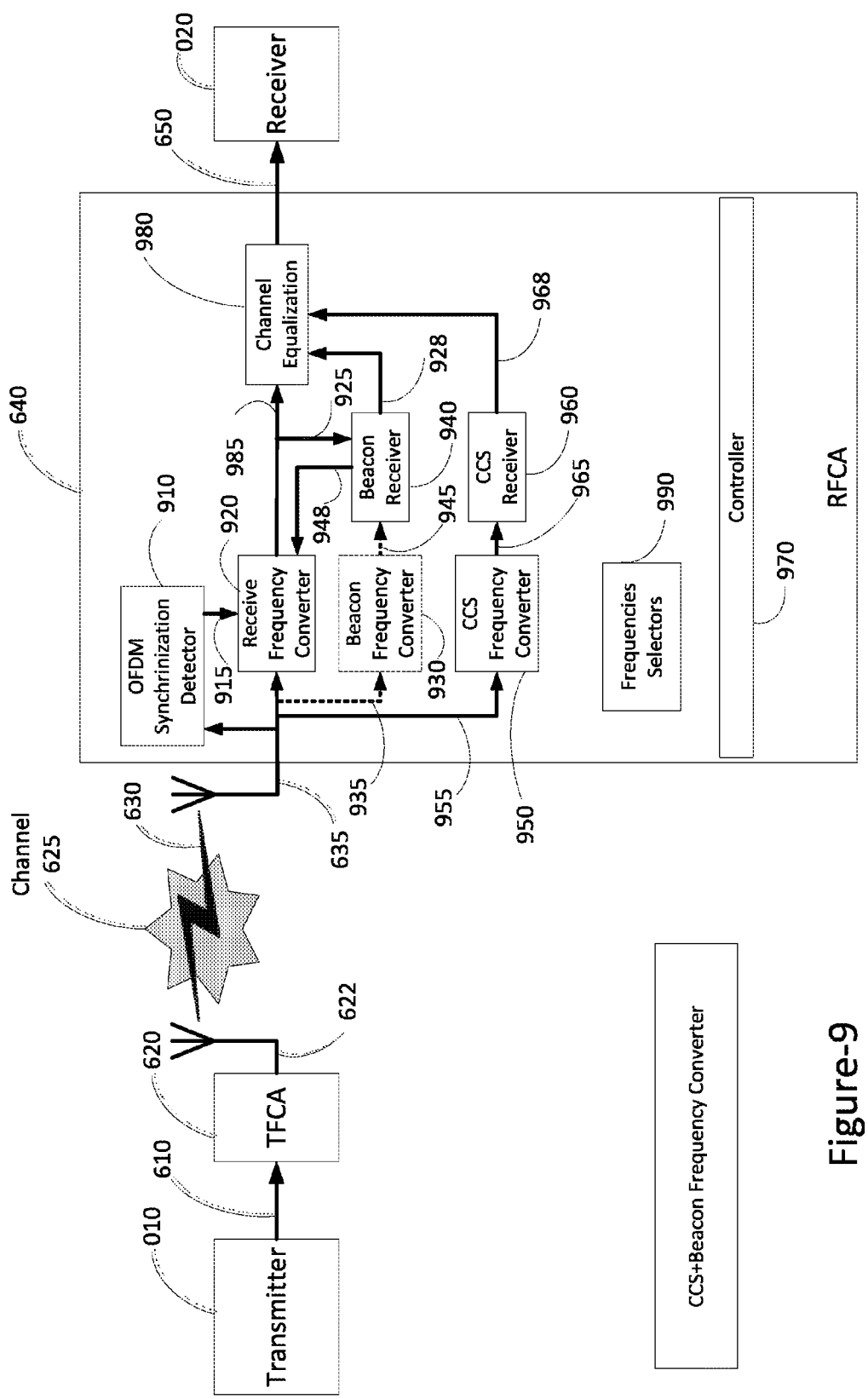
Figure 9A:
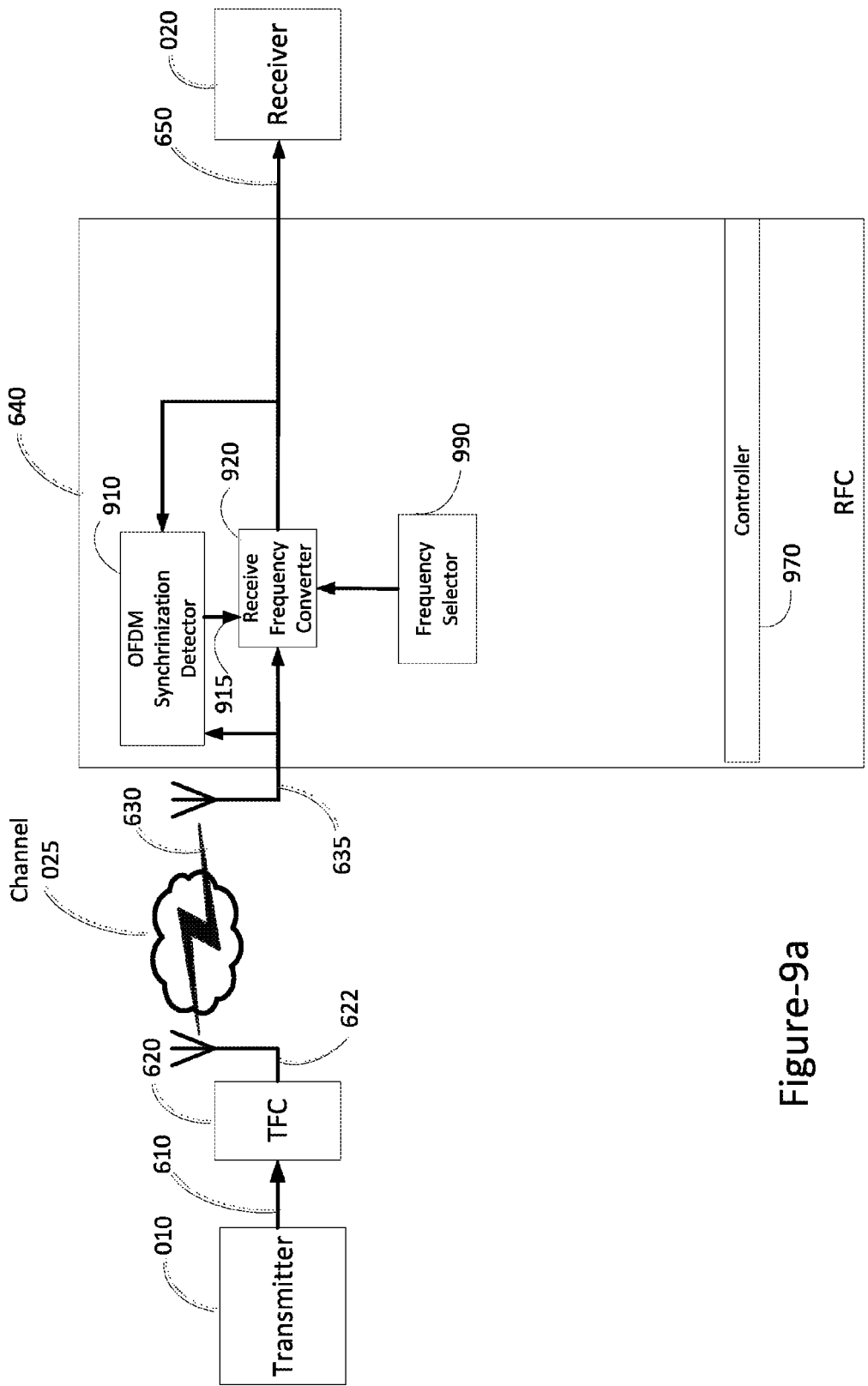

FIG. 9a depicts a more detailed block diagram of an example of the Reception Frequency Converter (RFC) portion of the add-on frequency diversity apparatus, according to a further embodiment of the present invention. In this embodiment, Reception Frequency Converter (RFC) 640 comprises some or all of the following, suitably coupled e.g. as shown: a synchronization detector 910, a receive frequency converter 920, and optionally a frequency selector 990. In the case of an OFDM communication protocol, synchronization detector 910 is an OFDM synchronization detector, as depicted in FIG. 9a, operative to detect predetermined portions of the OFDM signal. Alternatively, in the case of a CDMA communication protocol, synchronization detector 910 is a CDMA synchronization detector, operative to detect predetermined portions of the CDMA signal. Alternatively, according to the communication protocol, synchronization detector 910 is operative to detect predetermined portions of the relevant communication protocol signal.

Typically, synchronization detector 910 is operative to detect predetermined portions of the relevant communication protocol signal in which the frequency conversion/shift may be realized, as described above e.g. with reference to FIGS. 2-7. Typically, upon detection of said predetermined portion, the synchronization detector 910 synchronizes the receive frequency converter 920 to perform a change in the alternative center frequency, e.g. to perform a change in the active frequency shift. Receive frequency converter 920 is the actual component that performs the frequency conversion. The new alternative center frequency may optionally be determined by a frequency selector 990. Further optionally, a controller 970 resides in Reception Frequency Converter (RFC) 640, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, synchronization detector 910 may use the received signal 635 (e.g. the signal which is received at the alternative center frequency) for the purpose of detection and synchronization. Optionally, synchronization detector 910 may use the signal 650 (e.g. the signal which has the original center frequency) for the purpose of detection and synchronization. Further optionally, synchronization detector 910 may use both signals, 635 and 650.

Optionally, said predetermined portions of the signal, in which the frequency conversion/shift may be realized, are "non-critical regions" of the transmission, in that improper reception of these portions/regions is not as harmful to the receiver as other (critical) regions. Some examples of such portions/regions are described above e.g. with reference to FIGS. 2-5, and also hereinbelow.

Some examples of the operation of the synchronization detector 840 are:

a. In the case of a OFDM or OFDMA communication protocol, the synchronization detector 910 may be operative to detect the Cyclic Prefix (CP) of the OFDM/OFDMA symbols, and to synchronize the receive frequency converter 920 to perform a change in the alternative center frequency during reception of the Cyclic Prefix (CP).

b. In the case of a frame-based communication protocol, where a GAP or some guard period is placed between successive frames, the synchronization detector 910 may be operative to detect said GAP or guard period, and to synchronize the receive frequency converter 920 to perform a change in the alternative center frequency during said GAP or guard period.

c. In the case of a Time Division Duplex (TDD) communication protocol, where a GAP or some guard period is placed between the uplink subframe and the downlink subframe (or vice versa), the synchronization detector 910 may be operative to detect said GAP or guard period, and to synchronize the receive frequency converter 920 to perform a change in the alternative center frequency during said GAP or guard period.

d. In the case of a frame-based communication protocol, where an empty region (e.g. empty symbol as described above) is placed within the frames, the synchronization detector 910 may be operative to detect said empty region, and to synchronize the receive frequency converter 920 to perform a change in the alternative center frequency during said empty region.

e. In the case of a frame-based communication protocol, where a preamble or other known signal is placed within the frame, the synchronization detector 910 may be operative to detect the preamble or other known signal, and to synchronize the receive frequency converter 920 to perform a change in the alternative center frequency during non-critical regions (e.g. un-important symbol duration as described above).

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are able, if they so desire, to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. Add-on apparatus for dynamically enhancing frequency diversity of a main signal sent over an existing communication system, wherein the system uses using a communication protocol to convey the main signal from a Tx end to an Rx end, the add-on apparatus comprising:

a Transmission Frequency Converter at the Tx end operative while the system is transmitting the main signal, to at least once shift a given center frequency about which the system is transmitting, to at least one corresponding alternative center frequency, wherein the Transmission Frequency Converter and an Reception Frequency Converter at the Rx end share prior knowledge defining how each shift of the given center frequency is to be timed relative to at least one recognizable element, within the known communication protocol and wherein the Transmission Frequency Converter is operative to use said prior knowledge to recognize said at least one recognizable element and to shift the center frequency accordingly, wherein the Transmission Frequency Converter is operative to use prior knowledge regarding the communication protocol in order to recognize, in real time, at least one non-critical region within the main signal and to shift the center frequency during said non-critical region.

2. Apparatus according to claim 1 and also comprising an Reception Frequency Converter at the Rx end operative to use said prior knowledge to recognize said least one recognizable element and accordingly to restore signals received at said corresponding alternative center frequency to said given center frequency.

3. Apparatus according to claim 1 and also comprising a synchronization detector operative to trigger the Reception Frequency Converter to convert signals to said given center frequency, synchronously with the Transmission Frequency Converter's shifting of the given center frequency to the alternative center frequency.

4. Apparatus according to claim 1 wherein the non-critical region comprises a gap between frames of the main signal.

5. Add-on apparatus according to claim 1, the add-on apparatus comprising:
said Transmission Frequency Converter at the Tx end and an Reception Frequency Converter at the Rx end,
wherein the Transmission Frequency Converter and Reception Frequency Converter share prior knowledge defining how each shift of a given center frequency about which the system is transmitting, to at least one corresponding alternative center frequency is to be timed relative to at least one recognizable element within the known communication protocol
and wherein the Reception Frequency Converter at the Rx end is operative to use said prior knowledge to recognize said at least one recognizable element and accordingly to restore signals received at said corresponding alternative center frequency to said given center frequency.

6. Apparatus according to claim 1 wherein the Transmission Frequency Converter is operative to periodically shift the center frequency at which the system is transmitting.

7. Apparatus according to claim 1 and operative in conjunction with
at least one communication network node having a capacity for communicating with at least one additional communication network node at a given center frequency; and
wherein said converter comprises at least one external frequency converter, external to said node, operative to cause at least one communication network node, from outside said node, to communicate with at least one additional communication network node, at least on one occasion, according to a given communication protocol, at at least one converted center frequency which differs from said given center frequency.

8. Apparatus according to claim 1 wherein said frequency converter comprises a synchronization detector, operative to detect a predetermined portion of the signal of said communication protocol, and to synchronize said change in said alternative center frequency during said detected portion of the signal.

9. Apparatus according to claim 8 wherein said communication protocol comprises OFDMA communication protocol and wherein said predetermined portion is a Cyclic Prefix of an OFDMA symbol.

10. Apparatus according to claim 8, wherein said communication protocol is a Time Division Duplex (TDD) protocol, and wherein said predetermined portion is a gap between an uplink subframe and a downlink subframe of said communication protocol.

11. Apparatus according to claim 1 operative in conjunction with at least one communication network node having a capacity for communicating with at least one additional communication network node at a given center frequency,
and wherein said converter comprises at least one frequency converter, operative to cause at least one communication network node to communicate with at least one additional communication network node, at least on one occasion, according to a given communication protocol, at at least one converted center frequency which differs from said given center frequency.

12. Apparatus according to claim 11 wherein said node comprises a base station.

13. Apparatus according to claim 11 wherein said node comprises a mobile station.

14. Apparatus according to claim 11 wherein said capacity for communicating comprises a transmitting capacity and wherein said converter comprises a Tx frequency converter.

15. Apparatus according to claim 11 wherein said capacity for communicating comprises a receiving capacity and wherein said converter comprises an Rx frequency converter.

16. Apparatus according to claim 11 wherein said communication protocol comprises LTE.

17. A method for dynamically enhancing frequency diversity of a main signal sent over an existing communication system, wherein the system uses using a communication protocol to convey the main signal from a Tx end to an Rx end, the method comprising:
providing a Transmission Frequency Converter at the Tx end operative while the system is transmitting the main signal, to at least once shift a given center frequency about which the system is transmitting, to at least one corresponding alternative center frequency, wherein the Transmission Frequency Converter and an Reception Frequency Converter at the Rx end share prior knowledge defining how each shift of the given center frequency is to be timed relative to at least one recognizable element, within the known communication protocol and wherein the Transmission Frequency Converter is operative to use said prior knowledge to recognize said at least one recognizable element and to shift the center frequency accordingly,
wherein the Transmission Frequency Converter is operative to recognize, in real time, at least one non-critical region within the main signal and to shift the center frequency during said non-critical region.

18. A method for dynamically enhancing frequency diversity of a main signal sent over an existing communication system, wherein the method uses using a communication protocol to convey the main signal from a Tx end to an Rx end, the method comprising:
providing a Transmission Frequency Converter at the Tx end operative while the system is transmitting the main signal, to at least once shift a given center frequency about which the system is transmitting, to at least one corresponding alternative center frequency, wherein the Transmission Frequency Converter and an Reception Frequency Converter at the Rx end share prior knowledge defining how each shift of the given center frequency is to be timed relative to at least one recognizable element, within the known communication protocol and wherein the Transmission Frequency Converter is operative to use said prior knowledge to recognize said at least one recognizable element and to shift the center frequency accordingly, wherein the Transmission Frequency Converter is operative to use prior knowledge regarding the communication protocol in order to recognize, in real time, at least one non-critical region within the main signal and to shift the center frequency during said non-critical region.

19. The method according to claim 18 wherein the non-critical region comprises a gap between frames of the main signal.

20. The method according to claim 18 wherein the Transmission Frequency Converter is operative to periodically shift the center frequency at which the system is transmitting.

21. The method according to claim 18 operative in conjunction with at least one communication network node having a capacity for communicating with at least one additional communication network node at a given center frequency, and wherein providing said converter comprises providing at least one frequency converter, operative to cause at least one communication network node to communicate with at least one additional communication network node, at least on one occasion, according to a given communication protocol, at at least one converted center frequency which differs from said given center frequency.

* * * * *